United States Patent
Gebhardt et al.

(10) Patent No.: US 12,326,354 B2
(45) Date of Patent: Jun. 10, 2025

(54) CAPACITIVE FILLING LEVEL PROBE WITHOUT DEAD ZONE

(71) Applicant: RECHNER Industrie-Elektronik GmbH, Lampertheim (DE)

(72) Inventors: Stefan Gebhardt, Lampertheim (DE); Armin Kohler, Lampertheim (DE); Eduard Bischler, Lampertheim (DE); Nikita Philip Tatsch, Lampertheim (DE)

(73) Assignee: RECHNER Industrie-Elektronik GmbH, Lampertheim (DE)

( * ) Notice: Subject to any disclaimer, the term of this patent is extended or adjusted under 35 U.S.C. 154(b) by 203 days.

(21) Appl. No.: 17/882,954

(22) Filed: Aug. 8, 2022

(65) Prior Publication Data
US 2023/0042239 A1    Feb. 9, 2023

(30) Foreign Application Priority Data

Aug. 9, 2021 (EP) .................................. 21190413

(51) Int. Cl.
*G01F 23/263* (2022.01)
*G01N 35/10* (2006.01)

(52) U.S. Cl.
CPC ....... *G01F 23/265* (2013.01); *G01N 35/1009* (2013.01); *G01N 2035/1025* (2013.01)

(58) Field of Classification Search
CPC .... G01F 23/261; G01F 23/265; G01F 23/266; G01F 25/20; G01N 2035/1025
(Continued)

(56) References Cited

U.S. PATENT DOCUMENTS 3,119,266 A    1/1964 Atkinson
4,624,139 A *  11/1986 Collins ................ G01F 23/266
                                               73/304 C
(Continued)

FOREIGN PATENT DOCUMENTS

DE       2819731 A1    12/1979
DE      19528384 A1     2/1997
(Continued)

OTHER PUBLICATIONS

Mohr et al. "A new method for a self-calibrating capacitive sensor," IEEE Instrumentation and Measurement Technology Conference, Budapest, Hungary, May 21-23, 2001 pp. 454-459 (Year: 2001).*
(Continued)

*Primary Examiner* — John Fitzgerald
(74) *Attorney, Agent, or Firm* — Kaplan Breyer Schwarz, LLP

(57) ABSTRACT

A filling level measuring device, a method for capacitive filling level measurement of filling material in a container that includes a counter electrode integrated therein using a filling level probe, and a method for calibrating a filling level probe, that includes introducing the filling level probe into the container. The filling level probe has first and second spaced apart electrodes extending successively and substantially parallel to the counter electrode, thereby defining a measurement path. The level probe is operable in a first, second, or third measurement mode, by switching between a measurement potential or a shielding potential that can each be applied to the first and second electrodes, while a counter electrode potential is applied to the counter electrode. For capacitive filling level measurement, relative capacitance changes measured with a calibrated level probe in each measurement mode compared to an empty container, are used.

5 Claims, 9 Drawing Sheets

(58) Field of Classification Search
USPC .................................................. 73/304 C
See application file for complete search history.

(56) References Cited

U.S. PATENT DOCUMENTS

| | | | |
|---|---|---|---|
| 6,178,818 B1* | 1/2001 | Plochinger | G01F 23/268 |
| | | | 73/304 C |
| 7,161,361 B2 | 1/2007 | Qu et al. | |
| 8,931,340 B2* | 1/2015 | Wiederkind-Klein | ........................ |
| | | | G01F 23/268 |
| | | | 73/304 C |
| 9,429,461 B2* | 8/2016 | Gebhardt | G01F 23/268 |
| 10,288,467 B2* | 5/2019 | Shibata | G01F 23/266 |
| 2011/0314907 A1* | 12/2011 | Wiedekind-Klein | ........................ |
| | | | G01F 23/268 |
| | | | 73/304 C |
| 2020/0141789 A1* | 5/2020 | Schneider | G01N 27/22 |
| 2021/0262846 A1* | 8/2021 | Otagaki | G01F 23/265 |

FOREIGN PATENT DOCUMENTS

| | | | | |
|---|---|---|---|---|
| DE | 19749884 C1 | 8/1999 | | |
| DE | 19916979 A1 | 11/2000 | | |
| DE | 10251842 A1 | 5/2004 | | |
| EP | 2735851 A1 * | 5/2014 | .......... | G01F 23/266 |
| EP | 3457095 A1 | 3/2019 | | |
| IT | JA20164395 A1 | 12/2017 | | |
| WO | 0026619 A1 | 5/2000 | | |
| WO | 2004057281 A1 | 7/2004 | | |
| WO | 2020113283 A1 | 6/2020 | | |

OTHER PUBLICATIONS

Office Action issued in Canadian Patent Application No. 3,168,409 on Oct. 11, 2023.
Examiner: Nierhaus, Thomas, Office Action issued in European patent application No. 21190413.1, Jun. 21, 2022, 16 pp. w/ translation.

* cited by examiner

CAPACITIVE FILLING LEVEL PROBE WITHOUT DEAD ZONE

CROSS-REFERENCE TO RELATED APPLICATIONS

This application claims the benefit of foreign priority of European Patent Application No. 21 190 413.1, filed Aug. 9, 2021, the entire disclosure of which is incorporated herein by reference.

FIELD

The present invention relates to a filling level measuring device and to a method for capacitive filling level measurement of filling material in the form of liquids and/or bulk materials in a container which comprises a counter electrode integrated in the container. The invention furthermore includes a method for calibrating a filling level probe for a capacitive filling level measurement as mentioned above.

BACKGROUND

Capacitive filling level measurements are known in the prior art and are based on detecting a filling level, i.e. a filling height of liquids and/or bulk materials in a container by using a capacitive sensor to determine changes in capacitance caused by the filling of the container with a filling material or by emptying the container of filling material. For this purpose, measurement probes or sensors are employed, which are introduced into the mostly conductive container substantially vertically, and which have a measurement electrode. A capacitor arrangement is defined between the measurement electrode and the container wall as a counter electrode or a counter electrode arranged on the container wall substantially parallel to the measurement electrode. As the filling level of the filling material in the container increases or decreases, the capacitance value of the capacitor arrangement will increase or decrease. Hence, the capacitance value of the capacitor arrangement is a measure of the filling level or filling height of a filling material in the container and is used to calculate the filling level in the context of capacitive filling level measurements.

If the container is empty or filled with air, a minimum capacitance value results as a reference value (basic capacitance $C_0$), which ideally can be regarded to be constant. In fact, parasitic influences such as changes in humidity do result in deviations from this assumption of constancy. However, such deviations from the reference value are usually negligible compared to the changes in capacitance to be considered below.

If there is a filling material in the container, the capacitance of the capacitor arrangement will change as a function of the filling level of the filling material, the geometry of the capacitor arrangement, in particular the spacing between the capacitor plates, and the dielectric constant $\varepsilon_r$ of the respective filling material. The terms dielectric constant, permittivity, and relative permittivity have the same meaning and are used synonymously within the context of the present invention. A maximum change in capacitance that can be measured with the measuring probe will result at a maximum filling level of the filling material in the container, which is usually predetermined.

In order to obtain a linear dependency between the change in capacitance and the filling level of a filling material in the container, the cross section of the container and the diameter of the measuring probe must be consistent along the measurement section, i.e. within the range of measurement in the height direction of the container. Therefore, often, measurement arrangements are used in which the measuring probes are arranged inside a conductive tube or cylindrical container, so that a measurement arrangement in the form of a cylindrical capacitor is resulting. This has the advantage of having only slight field distortions or non-linearities occurring at the ends of the measuring probe, so that a falsification of the measured values at the start and end of the measuring range is fairly small and can usually be ignored.

The dependency on the permittivity of the filling materials is a challenge for capacitive filling level measurements, since the permittivity of a material can only be considered to be a constant material parameter in a few applications. What leads to significant deviations in the permittivity of a filling material, besides a change of the filling material and a mixing of different filling materials, are changes in the bulk density, changes in the moisture content, and inhomogeneities, among other things. Consequently, for capacitive filling level measurements, a so-called empty calibration and a so-called full calibration must usually first be performed for metrologically identifying the respective end values. Usually, the empty calibration is performed when the container is completely empty, but in some measurement arrangements it is performed at a predefined filling level. A full calibration corresponds to a container filled to a predefined maximum level. Mostly, the container has to be filled and emptied several times for the empty calibration and the full calibration, which is quite time-consuming. When the filling material changes, the empty calibration and full calibration must be performed again, since the end value identified in full calibration depends on the permittivity of the filling material.

In order to mitigate the aforementioned drawbacks, measurement arrangements and measuring methods for capacitively determining a filling level with compensation for changes in permittivity have already been used in the prior art.

For example, DE 195 28 384 C2 discloses a capacitive measuring device comprising two measurement electrodes arranged one above the other on a sensor, for continuous filling level measurement for media having different dielectric constants using the capacitive voltage divider principle, also known as the three electrode measuring principle. However, a permittivity-independent measurement is only possible within the range of the upper measurement electrode. In addition, a shielding electrode is required between the two measurement electrodes, which constitutes a dead zone with regard to the filling level measurement.

Applicant's DE 197 49 884 C1 describes a capacitive measuring device that is improved compared to DE 195 28 384 C2, comprising a reference electrode as the lower measurement electrode, an upper measurement electrode, and shielding electrodes which delimit the lower and upper measurement electrodes and decouple them from one another, but also constitute a dead zone for level measurement. Compared to DE 195 28 384 C2, improved calibration of a container in the empty state is described using the reference electrode.

WO 00/26619 A1 discloses a method for filling level measurement based on a first plate capacitor arrangement and a second plate capacitor arrangement each having a measurement electrode and a counter electrode as the measurement arrangement. While the first plate capacitor arrangement extends over at least part of the filling height of the container and is intended to determine the current filling level, the second plate capacitor arrangement serves to determine a reference value and is completely covered by filling material up to a known filling level mark to determine the dielectric constant of the filling material. If the current level falls below the known filling level mark, the dielectric constant determined most recently is used to determine the current filling level. However, for determining the current filling level, the geometry of the two plate capacitor arrangements must always be known, the capacitor plates have to be spaced apart far enough to avoid mutual field interference, and the filling material must be located between the two capacitor plates. Moreover, the current filling level can only be determined once the second plate capacitor arrangement has been completely covered by filling material.

A similar approach is also pursued by DE 102 51 842 A1 which discloses a device and a method for capacitive filling level measurement by comparing a measurement capacitance with a reference capacitance, with a closed control loop being used as the measurement circuit. The reference capacitance has a known geometry and is always completely surrounded by filling material. Based thereon, a relative permittivity $\varepsilon_r$ of the respective filling material is determined, which in turn is used to determine the filling level.

EP 3 457 095 A1 relates to a capacitive level sensor and a method for a capacitance measurement of the filling level of a filling material in a container including compensation for environmental influences. The filling level sensor comprises a measuring probe with at least one measurement electrode for determining a capacitance and for calculating a filling level, and at least one reference electrode arranged in the interior of the measuring probe for a capacitance measurement independent of the filling level to thus compensate for environmental influences on the capacitance measurement at the measurement electrode, such as temperature and humidity. The measuring probe may comprise a plurality of segments which are arranged one above the other along their longitudinal extension, each one having a measurement electrode and a reference electrode.

Applicant's EP 2 735 851 A1 discloses a method and a device for capacitive filling level measurement using a measurement circuit and a filling level probe. A first electrode arrangement functioning as a measurement electrode defines a measurement section and is formed on the filling level probe. A second electrode arrangement functioning as a boundary electrode is arranged at least at one end of this measurement section. Preferably, such a second electrode arrangement is provided at both end points of the measurement section, each defining a boundary of the measurement section. The measurement circuit includes a differential circuit, so as to produce a differential signal of a change in capacitance between a respective boundary electrode and a counter electrode, for example the container wall, and a change in capacitance between a measurement electrode and this counter electrode, in order to compensate for the systematic falsifications caused by changes in permittivity of the filling material.

WO 2020/113283 A1 discloses a capacitive sensor system and a method for detecting an object based on the identification of material properties, e.g. the dipole moment or permittivity, of this object. The capacitive sensor system comprises a capacitive sensing pad, a conductive discriminating pad in proximity to the sensing pad, a switch, a capacitance measurement circuit, and a controller. The switch selectively couples the discrimination pad to a voltage potential of the capacitive sensing pad or to a ground potential. The capacitance measurement circuit detects a capacitance value of the capacitive sensing pad. The controller is operable to measure the capacitance value of the capacitive sensing pad when the discriminating pad is coupled to the capacitive sensing pad voltage potential or to ground potential. In order to be able to determine the material properties, such as permittivity, of an object, the capacitive sensor pad has to be completely covered by the object to be identified.

SUMMARY

In the light of the prior art background mentioned above, it is an object of the invention to provide a filling level measuring device and a method for capacitive filling level measurement of filling material, which improves and simplifies the determination of a filling level based on measured capacitances compared to the prior art mentioned above, and which in particular is substantially continuous, independent of the permittivity and does not have any dead zones along the measurement section.

Accordingly, the invention proposes a filling level measuring device for capacitive filling level measurement of filling material in the form of liquids and/or bulk materials in a container that has a counter electrode integrated in the container, the measuring device comprising measuring electronics and a filling level probe connectable to the measuring electronics. The filling level probe has a first electrode and a second electrode provided thereon, which have to be introduced into the container for the filling level measurement and which, in their introduced state, extend into the container one after the other in alignment along their longitudinal extension and spaced apart from each other and substantially parallel to the counter electrode, so that when the container is being filled, the first electrode will first be covered by filling material before the second electrode is at least partially covered by filling material. The entire range between a first end of the first electrode remote from the second electrode and a second end of the second electrode remote from the first electrode defines a measurement section.

The measurement electronics are configured to provide a measurement potential, a shielding potential, and a counter electrode potential. Furthermore, the measurement electronics include a switching unit including a first switch that can be electrically connected to the first electrode and a second switch that can be electrically connected to the second electrode. For operating the filling level measuring device, the switching unit is operable to set a first, second, or third measurement mode, by having the first switch adapted to switch over between the measurement potential or the shielding potential that can be applied to the first electrode, and by having the second switch adapted to switch over between the measurement potential or the shielding potential that can be applied to the second electrode. In the first measurement mode, the measurement potential is applied to the first electrode and the shielding potential to the second electrode. In the second measurement mode the shielding potential is applied to the first electrode and the measurement potential to the second electrode, and in the third measurement mode the measurement potential is applied to the first and second electrodes. In each of the three measurement modes, the counter electrode potential is applied to the counter electrode. The measurement electronics furthermore comprise an evaluation unit that is electrically connected to the switching unit and adapted to control the switching unit and to calculate the filling level on the basis of relative changes in capacitance compared to a completely empty container as measured by the measurement electronics in each of the three measurement modes.

Within the context of the invention, the term capacitive filling level measurement is to be understood in that the filling level is determined, in particular calculated, on the basis of measured capacitance values, in particular measured relative changes in capacitance.

In the context of the invention, filling level always refers to the filling height of a filling material or of several filling materials in the container. When the filling level has been determined on the basis of measured relative changes in capacitance, the filling volume occupied by the one or more filling material(s) in the container corresponding to this filling level can be calculated if the geometry of the container is known.

Within the context of the invention, a counter electrode integrated in the container may be a counter electrode attached to a container wall, a counter electrode arranged inside or in the interior of the container, or the container wall can define the counter electrode. During operation of the filling level measuring device, the counter electrode always has to be arranged substantially parallel to the first and second electrodes.

According to the description above, the first electrode can be considered as the lower measurement electrode and the second electrode as the upper measurement electrode. In contrast to documents of the aforementioned prior art, which provide a reference electrode in the lower area of the filling level probe for determining the permittivity of a filling material in the container, the filling level measuring device according to the invention allows to detect a filling level over a significantly larger measuring range and in particular also in the lower area of the container, i.e. at lower filling levels.

As described above, the measurement section of the filling level probe extends over the entire range between the first end of the first electrode remote from the second electrode, i.e. the lower end point of the first electrode, and the second end of the second electrode remote from the first electrode, i.e. the top end point of the second electrode. This is ensured by the fact that, despite the electrical separation of the first and second electrodes, the spacing between the first and second electrodes in the direction of the filling height of the filling material is chosen to be as small as possible, so that the measurement section has virtually no interruption when the first and second electrodes are connected together as measurement electrodes, at least no interruption affecting the measurement, resulting in a quasi-continuous measuring range for continuous determination of the filling level along the measurement section without dead zones.

The switching unit provides for operation of the filling level measuring device in three different measurement modes. A measurement mode is defined by the respective state of the first and second switches and is determined by the fact to which one of the first and/or second electrodes the measurement potential is applied. The relative changes in capacitance that occur as a result of the filling level changing compared to an empty container can thus be detected according to the three measurement modes in a capacitor arrangement which includes the counter electrode and the first electrode and/or the second electrode as a measurement electrode with a measurement potential applied thereto. This provides for a more accurate, less error-prone calculation of the filling level in comparison to a filling level measuring device which can only be operated in one measurement mode or which only comprises one active measurement electrode in each case.

Furthermore, the invention proposes a method for capacitive filling level measurement of filling material in the form of liquids and/or bulk materials in a container that includes a counter electrode integrated in the container, wherein, after introducing into the container a filling level probe including a first electrode and a second electrode for filling level measurement, the first electrode is covered first by filling material when the container is being filled, before the second electrode is at least partially covered by filling material, and wherein the first and second electrodes extend into the container in longitudinal alignment one after the other and spaced apart from each other and substantially parallel to the counter electrode. A measurement section is defined by the entire range between a first end of the first electrode remote from the second electrode and a second end of the second electrode remote from the first electrode.

After execution of the steps of providing a measurement potential, a shielding potential, and a counter electrode potential, with the first and second electrodes connected and a counter electrode connected to measuring electronics, and with a counter electrode potential applied to the counter electrode and with the filling level probe calibrated, in particular after performing the calibration measurement according to the method for calibrating the filling level probe as described above, the method according to the invention comprises the steps of:

operating the first and second electrodes in a first, second, or third measurement mode by switching over between a measurement potential or a shielding potential that can be applied to the first and second electrodes, respectively, of the filling level probe, wherein in the first measurement mode the measurement potential is applied to the first electrode and the shielding potential to the second electrode, in the second measurement mode the shielding potential is applied to the first electrode and the measurement potential to the second electrode, and in the third measurement mode the measurement potential is applied to the first and second electrodes, and performing at least one filling level measurement, by measuring relative changes in capacitance compared to a completely empty container in each of the three measurement modes while the container is being filled and/or while the container is being emptied, and using them for calculating the filling level.

The method described above assumes that the filling level probe used for the filling level measurement has already been calibrated before the filling level measurement begins. A calibration of the filling level probe can be performed in particular within the context of the method according to the invention for calibrating the filling level probe. This method differs from the previously described method for capacitive filling level measurement substantially by the fact that the step of performing at least one filling level measurement is replaced by the step of performing a calibration measurement to calibrate the filling level probe, wherein relative changes in capacitance are determined between a completely empty container and a maximum filling level, in particular a filling level up to the second end of the second electrode remote from the first electrode, in at least the first and third measurement modes.

As an alternative to calibrating the filling level probe according to the calibration method of the invention, a filling level probe that has already been calibrated in advance can also be used for the capacitive filling level measurement in the method of the invention. In the context of the invention, filling level probe calibrated in advance refers to a filling level probe for which information is available at least about the lengths ratio between the first electrode and the second electrode, and for which the lengths of the first and second electrodes can be associated with respective heights of filling material. The information about the lengths ratio can for instance be estimated or obtained through experimental determination or may already be stored as a preset in the filling level probe. Additional information obtained through a calibration carried out in advance is not absolutely necessary for performing the filling level measurement for calculating the respective filling level. For example, it is not necessary as part of the calibration of the filling level probe to identify the permittivity of filling materials in order to determine the current filling level, so that the filling level measurement can be performed independently of the permittivity.

A further advantage of the method according to the invention for capacitive filling level measurement is that the geometry of the measurement arrangement used during the calibration of the filling level probe, e.g. the spacing between the first and second electrodes and the container wall, the spacing between the first and second electrodes and the counter electrode, and the position of the filling level probe in the container can differ from the geometry of the measurement arrangement provided during the filling level measurement. Thus, the calibration of the filling level probe and the filling level measurement do not necessarily have to be carried out in the same measurement arrangement. This makes it possible, for example, to replace the container and/or the counter electrode after the filling level probe has been calibrated for the filling level measurement, for example in the event of a defect, without the need for a new calibration of the filling level probe in the changed geometry of the measurement arrangement.

Accordingly, the measurement modes used in the method for capacitive filling level measurement and/or in the method for calibrating the filling level probe can each be executed cyclically.

In the method of capacitive filling level measurement, at least a first and/or a second threshold of the filling level can be detected, which can contribute to the determination of the current filling level.

Furthermore, at least two different algorithms can be executed during the filling level measurement, and for calculating a respective current filling level on the basis of the relative changes in capacitance measured for this purpose, the respective algorithm to be executed is selected.

In summary, the invention relates to a filling level measuring device and to a method for capacitive filling level measurement of filling material in a container having a counter electrode integrated therein using a filling level probe, and to a method for calibrating a filling level probe.

The filling level probe to be introduced into the container is provided with a first and a second electrode which are spaced apart from one another and extend one after the other and substantially parallel to the counter electrode, so that a measurement section is defined along the first and second electrodes and the spacing therebetween.

The filling level probe can be operated in a first, second, or third measurement mode, by being operable to switch over between a measurement potential or a shielding potential both of which can be applied to the first and second electrodes, respectively, while a counter electrode potential is always applied to the counter electrode. For calibrating the filling level probe, relative changes in capacitance are determined between an empty container and a maximum level. For capacitive filling level measurement, relative changes in capacitance compared to an empty container are measured with a calibrated filling level probe in each of the three measurement modes and are used to calculate the filling level.

BRIEF DESCRIPTION OF THE DRAWINGS

The invention will now be described in more detail by way of some preferred, although only exemplary embodiments with reference to the accompanying drawings, wherein.

DETAILED DESCRIPTION

Preferred embodiments within the scope of the invention will now be described with reference to the drawings.

Figure 1:
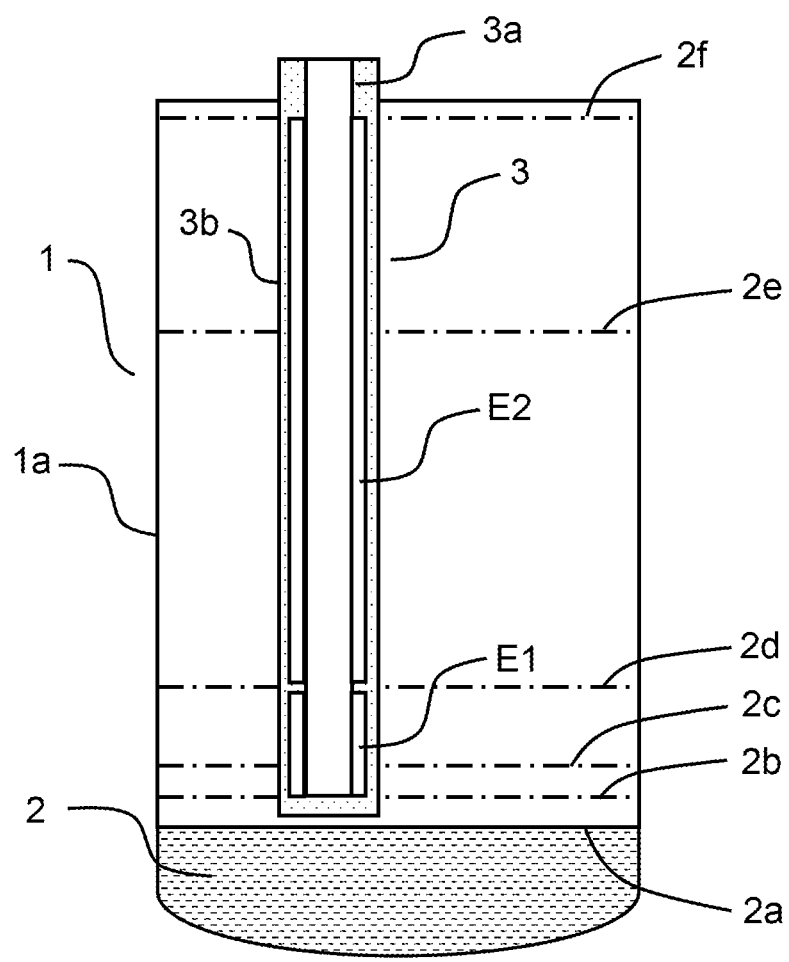
FIG. 1 is a schematic sectional view of a filling level probe of a filling level measuring device according to the invention, introduced in a container, according to a first embodiment.

FIG. 1 shows an exemplary schematic sectional view of a filling level probe 3 of a filling level measuring device according to the invention, placed in a container 1 for capacitive filling level measurement of filling material 2 in the form of liquids and/or bulk materials according to a first embodiment. FIG. 1 is meant to illustrate an exemplary configuration and an exemplary installation position of the filling level probe 3 placed in container 1, and to indicate exemplary filling levels 2a, 2b, 2c, 2d, 2e, 2f of a filling material 2.

According to FIG. 1, the container 1 comprises a counter electrode, and in the illustrated example the wall 1a of container 1, i.e. container wall 1a, is in the form of a counter electrode. However, in further embodiments, not shown, the counter electrode may also be attached to the container wall 1a or arranged inside the container 1.

In FIG. 1, the filling level probe 3 is mounted substantially vertically inside the container 1. A first electrode E1 and a second electrode E2 are provided on filling level probe 3. In FIG. 1, filling level probe 3 comprises a substrate 3a, in particular made of and/or preferably surrounded by at least one electrically insulating material 3b, on which the first and the second electrodes E1, E2 are attached in alignment along their longitudinal extensions. In the illustrated example, this substrate 3a is in the form of a rod, but may be in the form of a plate, for example, in an alternative embodiment.

In their installed state as shown in FIG. 1, the first electrode E1 and the second electrode E2 extend into the container 1 one after the other in alignment along their longitudinal extension and spaced apart from each other and substantially parallel and therefore also equidistant to the counter electrode, such that, when the container 1 is being filled, the first electrode E1 will first be covered by filling material 2 before the second electrode E2 is at least partially covered by filling material. Thus, in its installed state in the container 1, the first electrode E1 can be referred to as the lower electrode, and the second electrode E2 can be referred to as the upper electrode. A measurement section is defined by the entire range between a first end of the first electrode E1 remote from the second electrode E2 and a second end of the second electrode E2 remote from the first electrode E1. The first end of the first electrode E1 remote from the second electrode E2 corresponds to a lower end point of the measurement section, and the second end of the second electrode E2 remote from the first electrode E1 corresponds to an upper end point of the measurement section. Thus, the measurement section also includes the range where the first electrode E1 and the second electrode E2 are spaced apart from one another. This is ensured by choosing the extent of the spacing between the first and second electrodes E1, E2 in the direction of the filling level to be as small as possible, so that, despite the electrical separation between the first and second electrodes E1, E2, the measurement section will exhibit nearly no interruption, at least almost no metrologically recognizable one, when the first and second electrodes E1, E2 are connected together as measurement electrodes, resulting in a quasi-continuous measuring range for continuous determination of a filling level along the measurement section without any dead zones. In practical implementation, this is the case in particular when the resulting electric field of the first and second electrodes E1, E2 to the counter electrode is the most continuous possible, i.e. the electric fields between the first electrode E1 and the counter electrode and between the second electrode E2 and the counter electrode overlap or at least adjoin each other. With regard to the choice of the spacing between the first and second electrodes E1, E2, the need for electrical separation between the first and second electrodes E1, E2 implies a lower limit value, while the requirement for a measurement path that is as uninterrupted as possible implies an upper limit value. An acceptable spacing between the first and second electrodes E1, E2 is therefore suitably derived substantially on the basis of the geometry of the filling level probe and is preferably less than half the width or the diameter of the first and/or second electrode E1, E2. In FIG. 1, the spacing between the first electrode E1 and the second electrode E2 is approximately 1 mm. However, embodiments in which the spacing is larger or even smaller are conceivable as well.

The first electrode E1 has a first length L1 and the second electrode has a second length L2, and in the example of FIG. 1 the second length L2 of the second electrode E2 is approximately 5 times greater than the first length L1 of the first electrode E1. In an alternative embodiment, the second length L2 can in particular be of the same dimension as the first length L1 or can be greater than the first length L1 by a factor different from the factor mentioned above. If the second length L2 is greater than the first length L1, so that the second length L2 takes a larger proportion of the entire measurement section than the first length L1, this has the advantage, in particular when measuring the filling level while the container 1 is being filled, that relative changes in capacitance can be detected more accurately over a larger measuring range of the second electrode E2, and consequently a more accurate, less erroneous calculation of the respective filling level can be achieved. The measuring range of the second electrode E2 describes the measuring range in a capacitor arrangement consisting of the counter electrode and the second electrode E2 as the measurement electrode, while the measuring range of the first electrode E1 describes the measuring range in a capacitor arrangement consisting of the counter electrode and the first electrode E1 as the measurement electrode. If a filling level measurement is performed in the measuring range of the second electrode E2 when the container 1 is being filled, there will also be available relative changes in capacitance as measured within the measuring range of the first electrode E1 as measurement results for calculating the current filling level, in addition to the resulting relative changes in capacitance measured. Since the first and second lengths L1, L2 of the first and second electrodes E1, E2 extend in the height direction of the filling material, these lengths can be associated with corresponding filling material levels in the container 1.

As an alternative to the embodiment shown in FIG. 1, the first and/or second electrodes can also be configured as individual rings or plates with an insulator.

Furthermore, FIG. 1 shows various possible filling levels 2a, 2b, 2c, 2d, 2e, 2f of a filling material 2 in the container 1. Filling level 2a which is below the first electrode E1 indicates a filling level which is clearly outside the measuring range of filling level probe 3, the measuring range of filling level probe 3 being substantially defined by a capacitor arrangement between the counter electrode and the measurement section. Accordingly, the filling level 2a usually cannot be captured by the filling level probe 3 shown in FIG. 1.

At a filling level 2b, a capacitor arrangement consisting of a counter electrode and a first electrode E1 as the measurement electrode will already be capable of measuring a relative change in capacitance compared to a completely empty container 1. The magnitude of the relative change in capacitance is a function of the permittivity of the filling material 2 in each case.

Filling level 2c corresponds to a filling level which is within the measuring range of the first electrode E1, so that a relative change in capacitance compared to a completely empty container 1 can be measured in the capacitor arrangement consisting of the counter electrode and the first electrode E1 as the measurement electrode. If the first electrode E1 is not operated as a measurement electrode, but only the second electrode E2, it will be impossible to measure any relative change in capacitance compared to a completely empty container 1 at a filling level 2c.

Filling level 2d corresponds to a filling level that is within a range in which the first electrode E1 and the second electrode E2 are electrically isolated and spaced apart from one another. Thus, the first electrode E1 will be completely covered by filling material 2 at the filling level 2d. The relative change in capacitance measured in the capacitor arrangement consisting of the counter electrode and the first electrode E1 as the measurement electrode will assume a maximum value that depends on the permittivity of the filling material 2, and will no longer change significantly as a result of continuing filling of the container 1 with the same filling material 2, since such a change in the filling level is outside the measuring range of the first electrode E1. If the permittivity of the filling material 2 is sufficiently high, a relative change in capacitance may already be measurable in a capacitor arrangement consisting of the counter electrode and the second electrode E2 as the measurement electrode.

Filling level 2e corresponds to a filling level which is within the measuring range of the second electrode E2. In a capacitor arrangement consisting of the counter electrode and the second electrode E2 as the measurement electrode, a relative change in capacitance compared to a completely empty container 1 will therefore be measurable, which increases while the container 1 is filled and decreases while the container 1 is emptied. If, on the other hand, only the first electrode E1 is operated as a measurement electrode, the relative change in capacitance measured at filling level 2e will substantially corresponds to the relative change in capacitance measured at filling level 2d, since a change to filling level 2e is outside the measuring range of the first electrode E1.

Filling level 2f is a maximum filling level in the container 1. In the present example of FIG. 1, the maximum filling level can be equated with a filling level up to the upper end of the second electrode E2 or up to the upper end of the measurement section of filling level probe 3, so that the first and second electrodes E1, E2 are completely covered by filling material 2. Irrespective of whether only the first electrode E1 or only the second electrode E2 is operated as a measurement electrode, or whether both the first and second electrodes E1, E2 are operated as interconnected measurement electrodes, the relative change in capacitance measured at the filling level 2f will always substantially be a maximum value.

Figure 2:
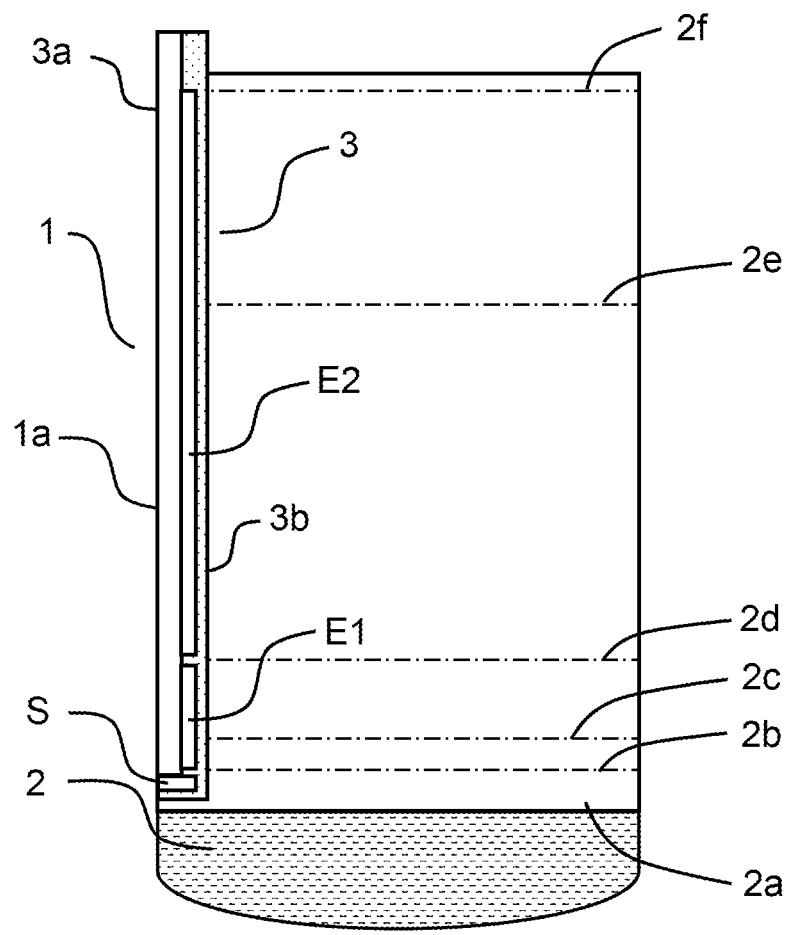
FIG. 2 is a schematic sectional view of a filling level probe of a filling level measuring device according to the invention, introduced in a container, according to a second embodiment.

FIG. 2 shows an exemplary schematic sectional view of a filling level probe 3 placed in a container 1 of a filling level measuring device according to the invention for capacitive filling level measurement of filling material 2 in the form of liquids and/or bulk materials according to a second embodiment. The embodiment shown in FIG. 2 differs from the embodiment shown in FIG. 1 only by the fact that the filling level probe 3 is mounted substantially vertically inside the container wall 1a and has a shielding electrode S. Shielding electrode S is disposed between the first end of the first electrode E1, i.e. the lower end of the first electrode E1, and a bottom of the container 1. Shielding electrode S allows to shield the electric field of the first electrode E1 towards the bottom of the container 1. The feature of a shielding electrode S integrated in the filling level probe 3 should be considered independently of how the filling level probe 3 is mounted in the container 1. In an alternative embodiment, the filling level probe can also be mounted substantially vertically on the container wall.

Figure 3:
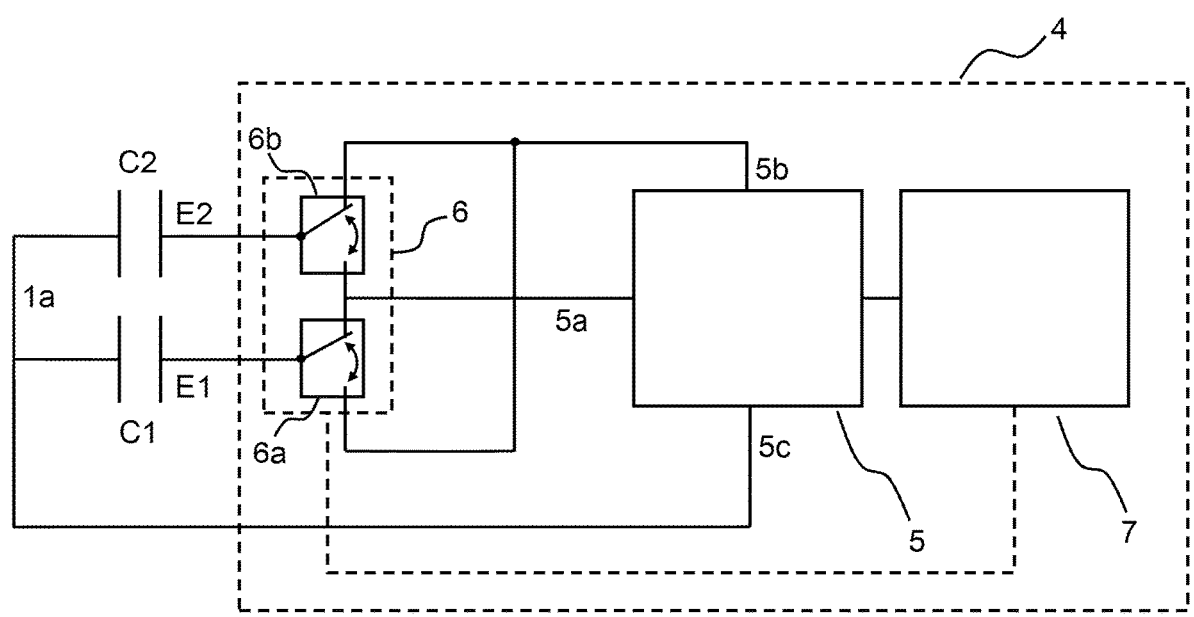
FIG. 3 is a schematic diagram of a measurement arrangement of a filling level measuring device according to the invention with measuring electronics in the first measurement mode.
Figure 4:
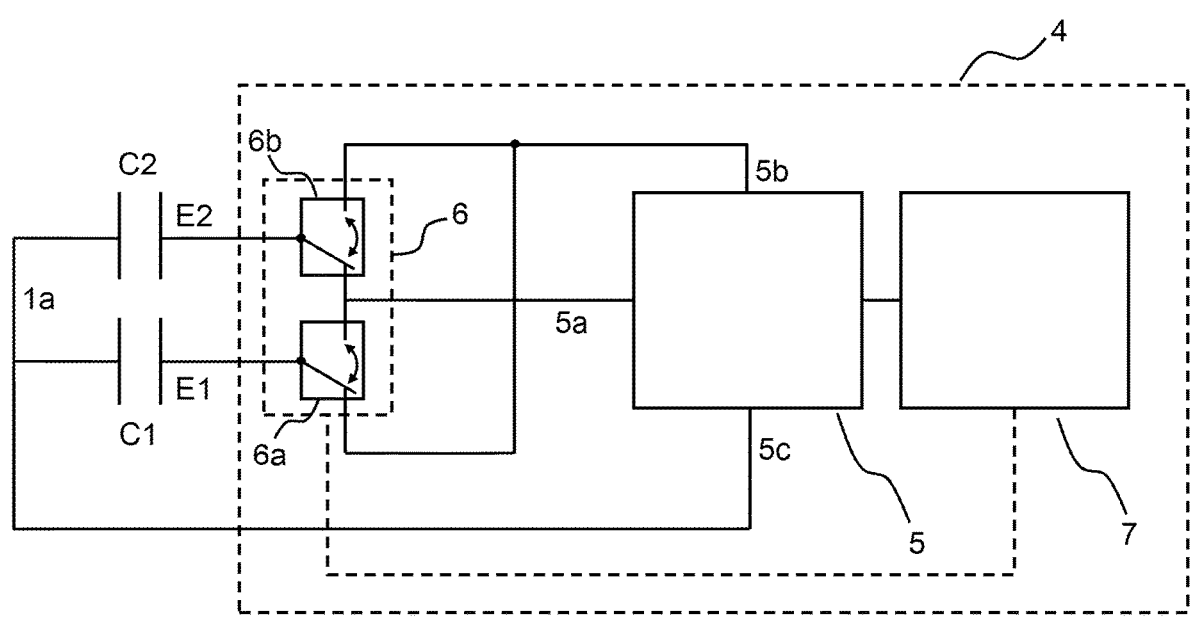
FIG. 4 is a schematic diagram of a measurement arrangement of a filling level measuring device according to the invention with measuring electronics in the second measurement mode.
Figure 5:
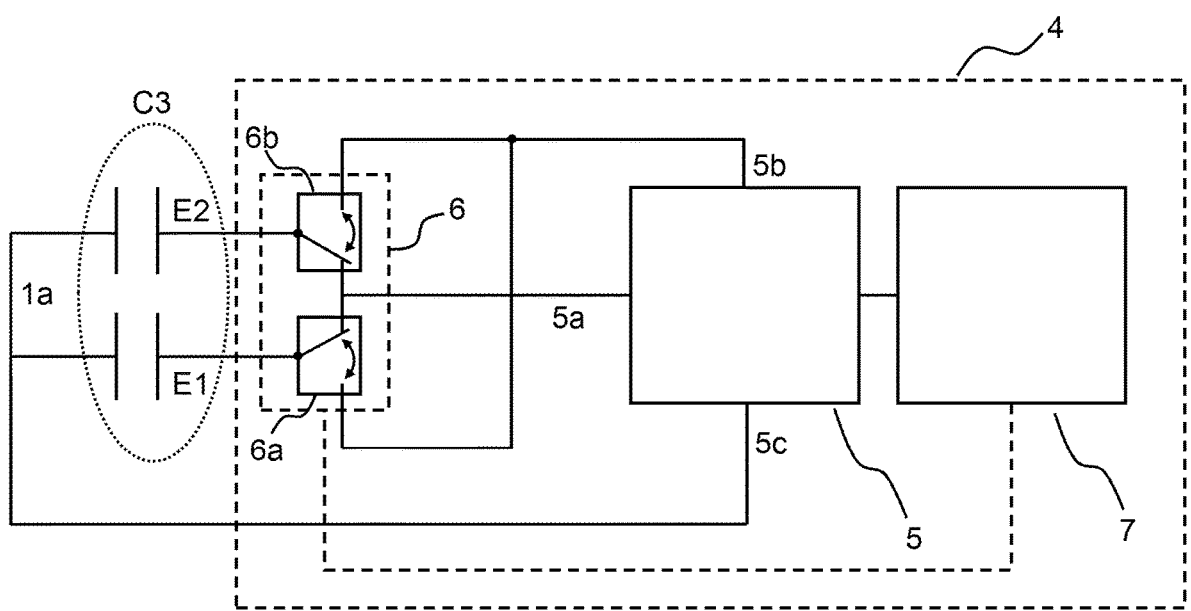
FIG. 5 is a schematic diagram of a measurement arrangement of a filling level measuring device according to the invention with measuring electronics in the third measurement mode.

Each of the filling level probes shown in FIGS. 1 and 2 can be connected to measuring electronics included in the filling level measuring device according to the invention. FIGS. 3, 4, and 5 each show a schematic diagram of a measurement arrangement of a filling level measuring device according to the invention with measuring electronics 4. In the present example, measuring electronics 4 is a three-electrode measuring electronics comprising a capacitive measurement circuit 5 which is configured to provide a measurement potential 5a, a shielding potential 5b, and a counter electrode potential 5c. The measurement electronics 4 furthermore comprise a switching unit 6 which includes a first switch 6a that can be electrically connected to the first electrode E1, and a second switch 6b that can be electrically connected to the second electrode E2. First switch 6a is adapted to switch over between measurement potential 5a or shielding potential 5b that can be applied to the first electrode E1, and second switch 6b is adapted to switch over between measurement potential 5a or shielding potential 5b that can be applied to the second electrode E2. Counter electrode potential 5c is always applied to the counter electrode, and in FIGS. 1-5 the container wall 1a is in the form of a counter electrode, by way of example. With the aid of switching unit 6, the filling level measuring device according to the invention can be operated in first, second, and third measurement modes, and in each of the three measurement modes, the measurement potential 5a is applied to at least one of the first and second electrodes E1, E2.

FIGS. 3, 4, and 5 differ from one another in terms of the measurement mode set by the switching unit 6. In FIG. 3, the measuring electronics 4 are set up to operate the filling level measuring device in the first measurement mode, in which the first switch 6a and the second switch 6b are set such that the measurement potential 5a is applied to the first electrode E1 and the shielding potential 5b is applied to the second electrode E2. Thus, a capacitance can be measured in a capacitor arrangement consisting of the counter electrode and the first electrode E1 as the measurement electrode, which is determined in the measuring electronics 4 as a relative change in capacitance C1 compared to a completely empty container 1.

In contrast to FIG. 3, the measuring electronics 4 in FIG. 4 are set so as to operate the filling level measuring device in the second measurement mode. In the second measurement mode, first switch 6a is set such that the shielding potential 5b is applied to the first electrode E1, while second switch 6b is set such that the measurement potential 5a is applied to the second electrode E2. Thus, a capacitance can be measured in a capacitor arrangement consisting of the counter electrode and the second electrode E2 as the measurement electrode, which again is determined in the measuring electronics 4 as a relative change in capacitance C2 compared to a completely empty container 1.

FIG. 5, on the other hand, shows measuring electronics 4 set up to operate the filling level measuring device in the third measurement mode. In the third measurement mode, the first and second switches 6a, 6b of switching unit 6 are set such that the measurement potential 5a is applied to both the first electrode E1 and the second electrode E2. The first and second electrodes E1, E2 thus function together as a measurement electrode and, together with the counter electrode, define a capacitor arrangement which can be used to measure a capacitance, which is determined by the measuring electronics 4 as a relative change in capacitance C3 compared to a completely empty container 1. It should be noted that the capacitance measured when the first and second electrodes E1, E2 are connected together as measurement electrodes does not correspond to the sum of the capacitances which are measured in a capacitor arrangement consisting of the counter electrode and the first electrode E1 as a measurement electrode and of the counter electrode and the second electrode E2 as the measurement electrode, due to non-linearities caused by parasitic capacitances in the signal path.

The measuring electronics 4 shown in FIGS. 3, 4, and 5 furthermore always include an evaluation unit 7 that is electrically connected to the switching unit 6 and measurement circuit 5. Evaluation unit 7 is adapted to control the switching unit 6 and to calculate the current filling level on the basis of the relative changes in capacitance as measured in measurement electronics 4 compared to a completely empty container 1 in each of the three measurement modes.

Figure 6:
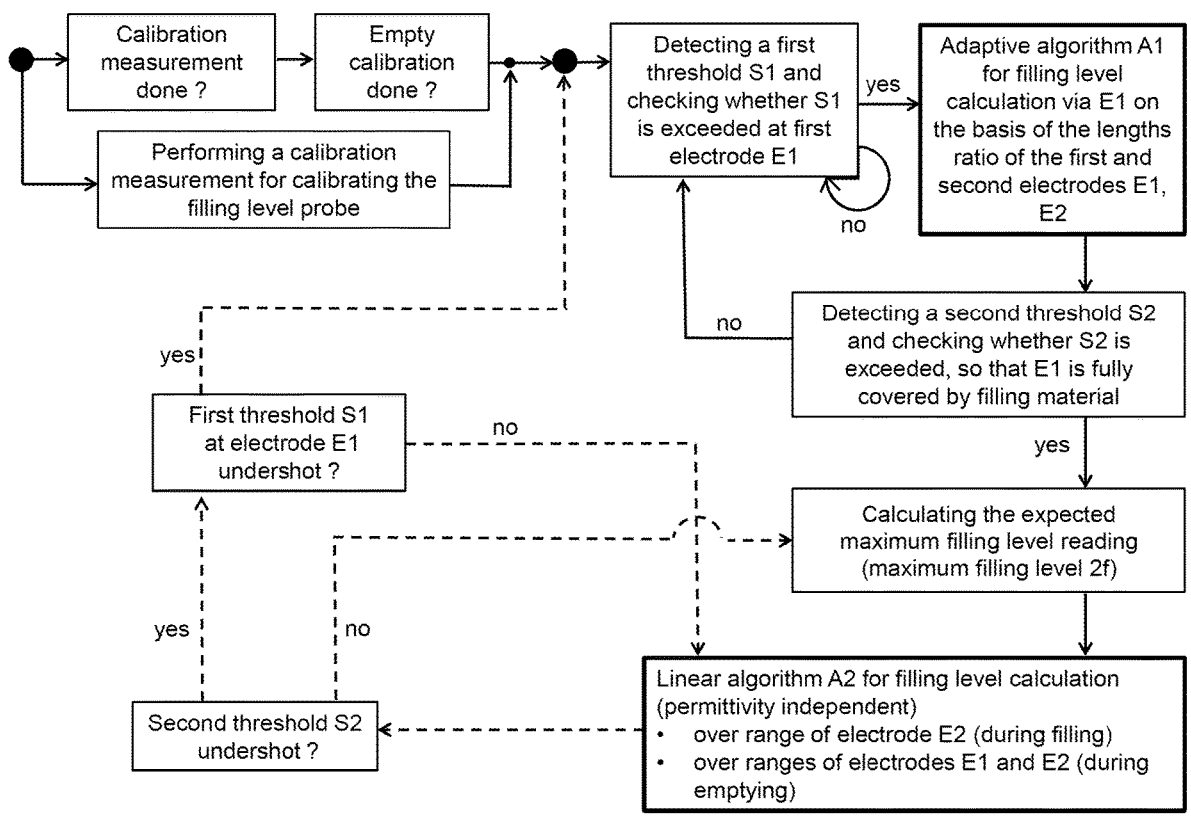
FIG. 6 is a schematic flowchart of a method for capacitive filling level measurement according to the invention.

FIG. 6 shows a schematic flowchart of an exemplary method according to the invention for capacitive filling level measurement of filling material in a container that includes a counter electrode, and gives a basic overview of a possible processing sequence in which the container is first filled with filling material (solid line) and then can be emptied (dashed line). Thus, what is not shown in FIG. 6 is that the method will only be carried out after a filling level probe comprising a first electrode E1 and a second electrode E2 for measuring the filling level has been introduced into the container. As can be seen in FIGS. 1 and 2, for example, in the installed state of the filling level probe, the first and second electrodes E1, E2 are arranged such that when the container is being filled, the first electrode E1 will first be covered by filling material before the second electrode E2 is at least partially covered by filling material, and with the first and second electrodes extending into the container in longitudinal alignment one after the other and spaced apart from each other and substantially parallel to the counter electrode. As already described with reference to FIGS. 1 and 2, a measurement section is defined by the entire range between the first end of first electrode E1 remote from the second electrode E2 and the second end of second electrode E2 remote from the first electrode. Once a measurement potential, a shielding potential, and a counter electrode potential have been provided, the first and second electrode and the counter electrode have been connected to the measurement electronics, as shown in FIGS. 3, 4, 5 by way of example, and the counter electrode potential has been applied to the counter electrode, the method for capacitive filling level measurement can be carried out using a calibrated filling level probe.

A method step not illustrated in FIG. 6 for the sake of clarity is the operation of the first and second electrodes E1, E2 in a first, second, or third measurement mode by switching over between a measurement potential or shielding potential to be applied to the first and second electrode E1, E2, respectively, of the filling level probe. In the first measurement mode, the measurement potential is applied to the first electrode E1 and the shielding potential to the second electrode E2, as shown in FIG. 3, while in the second measurement mode the shielding potential is applied to the first electrode E1 and the measurement potential to the second electrode E2, as shown in FIG. 4. In the third measurement mode, the measurement potential is applied to the first and second electrodes E1, E2, as shown in FIG. 5. This is followed by the step of performing at least one filling level measurement, by measuring relative changes in capacitance with respect to a completely empty container in each of the three measurement modes while the container is being filled and/or while the container is being emptied, and using them for calculating the filling level. A filling level measurement is preferably performed continuously, as is the case in the example of FIG. 6. More particularly, the first, second, and third measurement modes are each executed cyclically while the filling level measurement is being carried out, specifically independently of the respective current filling level. This enables a quick comparison of the relative changes in capacitance measured in each of the three measurement modes, so that the current filling level can be calculated more reliably and more precisely than would be the case without cyclical execution.

Preferably, two different algorithms A1, A2 are executed while the filling level measurement is being carried out, and for calculating a current filling level on the basis of the relative changes in capacitance measured for this purpose, the respective algorithm A1, A2 to be executed is selected. Explanations of the two algorithms A1, A2 mentioned in FIG. 6 follow below.

As illustrated in FIG. 6, before performing a filling level measurement, it may optionally first be checked whether a calibration measurement for calibrating the filling level probe has been performed. Thereafter, optionally, it may be checked whether an empty calibration was done as well. Empty calibration means a capacitance measurement with a completely empty container, i.e. with a container without any product in it.

Prior to starting a filling level measurement, it is always necessary for the filling level probe to be calibrated as mentioned above. This can be done, for example, by the method according to the invention for calibrating the filling level probe, as illustrated in FIG. 6 as an alternative to the checking whether a calibration measurement and/or an empty calibration has been done. The method for calibrating the filling level probe is performed in a container that includes a counter electrode integrated therein. A filling level probe with a first electrode E1 and a second electrode E2 is introduced into the container for calibration, so that when the container is being filled, the first electrode E1 will first be covered by filling material before the second electrode E2 is at least partially covered by filling material, and the first and second electrodes E1, E2 extend into the container in longitudinal alignment one after the other and spaced apart from each other and substantially parallel to the counter electrode, as illustrated in FIG. 1 or 2, for example. Thus, a measurement section is defined by the entire range between a first end of the first electrode E1 remote from the second electrode E2 and a second end of the second electrode E2 remote from the first electrode E1. After the filling level probe has been introduced into the container, a measurement potential, a shielding potential, and a counter electrode potential are provided, and subsequently the first and second electrodes E1, E2 and the counter electrode are connected to measuring electronics. The counter electrode potential is applied to the counter electrode. The first and second electrodes E1, E2 are operated in the first, second, or third measurement mode which have already been defined in conjunction with the method for capacitive filling level measurement, by switching between a measurement potential or shielding potential that can be applied to the first and second electrodes E1, E2 (see FIGS. 3, 4, 5). Finally, a calibration measurement is performed to calibrate the filling level probe, by determining relative changes in capacitance between a completely empty container and a maximum filling level in at least the first and third measurement modes. In this case, at least the first and the third measurement modes are preferably each executed cyclically. The relative changes in capacitance may also be determined in each of the three measurement modes in order to provide for a more precise calibration of the filling level probe using additional measurement data.

The calibration method is in particular carried out under the assumption that the underlying measurement arrangement substantially corresponds to a cylindrical capacitor. A first capacitance measurement is performed in empty calibration and a second capacitance measurement is performed at a predetermined maximum filling level of the container, i.e. in full calibration, by identifying relative changes in capacitance compared to the capacitances determined during empty calibration. A predetermined maximum filling level is in particular given when a filling material held in the container reaches a filling height up to the second end of the second electrode remote from the first electrode, and thus up to the upper end of the measurement section of the filling level probe, so that the first electrode and the second electrode are completely covered by this filling material.

The method for calibrating the filling level probe can also be performed without filling the container with filling material, for example using a calibration device mimicking a filling level measurement. The filling of the container with filling material may be simulated, for example, by having the counter electrode designed to be movable so that it can assume two different positions corresponding to a completely empty container and to a predetermined maximum filling level of the container. In this case, the predetermined maximum filling level corresponds to a simulated filling level up to the second end of the second electrode remote from the first electrode.

Furthermore, a calibration value can be calculated on the basis of the determined relative changes in capacitance as part of the method for calibrating the filling level probe. The calibration value is preferably substantially proportional to a ratio of the first length of the first electrode E1 to the second length of the second electrode E2, which may also be a ratio between the first or second length and the total of the first and second lengths, and a ratio inverse thereto. The purpose of calibrating the filling level probe is therefore primarily to obtain information about the lengths ratio between the first electrode and the second electrode. In contrast to prior art documents, it is not necessary to determine a relative permittivity of the filling material as part of the calibration of the filling level probe.

As can be seen in FIG. 6, the optional steps for checking about a calibration measurement and an empty calibration are not necessary if the filling level probe was calibrated before performing a first level measurement according to the method described above, since an empty calibration is performed in at least the first and third measurement modes as part of the calibration measurement. However, in the case of a calibrated filling level probe that has not been calibrated as part of the calibration procedure described above, this check can be helpful in order to avoid measurement errors and, if necessary, to perform a respective empty calibration.

According to the processing sequence outlined in FIG. 6, a first threshold S1 of the filling level is preferably detected based on relative changes in capacitance measured in the first measurement mode. This first threshold S1 substantially corresponds to a level up to the first end of the first electrode E1 remote from the second electrode E2, i.e. up to the lower end of the first electrode E1 and thus the lower end of the measurement section of the filling level probe. The first threshold S1 does not necessarily mean a specific value, but rather a limited range of values around the lower end of the measurement section, and is therefore also referred to as the first filling material threshold. The method according to the invention allows to determine filling levels at least when the first threshold S1 is exceeded while the container is being filled, and at least until it falls below the first threshold S1 while the container is emptied. According to FIG. 6, it is therefore intended to check whether the first threshold or the first filling material threshold S1 has been exceeded. This can be determined on the basis of relative changes in capacitance compared to the empty calibration, as measured at least in the first but also in the third measurement mode, and these values do not only depend on the filling level but also on the permittivity of the filling material. For example, in the case of a filling material which has a permittivity that differs only slightly from the permittivity of air, $\varepsilon_r=1.00059$, the detection of relative changes in capacitance will be less precise and therefore more prone to errors than in the case of a filling material which has a permittivity that is significantly different from the permittivity of air.

As can be seen from FIG. 6, a first algorithm A1 is preferably executed to calculate the filling level when the filling level increases, usually when the container is being filled, specifically at least as soon as the first threshold S1 is exceeded. The first algorithm A1 evaluates a ratio of the relative change in capacitance measured in the first measurement mode and the relative change in capacitance measured in the second measurement mode, taking into account the lengths ratio between the first and second electrodes E1, E2 as resulting from the calibration of the filling level probe. According to FIG. 6, the first algorithm A1 is an adaptive algorithm, since it gradually adapts the calculation of the filling level and, if necessary, improves it. Depending on whether the container is being filled or emptied, FIG. 8 (filling) and FIG. 9 (emptying) illustrate, at which heights of filling material in the container the adaptive algorithm can in principle be executed for calculating the filling level. According to FIGS. 8 and 9, the adaptive algorithm embodied as the first algorithm A1 can even be executed below the first threshold S1. In this case, during filling, the adaptive algorithm will output a non-zero calculated filling level only shortly before the first threshold S1 is reached, while during emptying it will continuously output a calculated filling level that gradually approaches zero.

Furthermore, the method for capacitive filling level measurement according to the exemplary flowchart of FIG. 6 comprises the step of detecting a second threshold S2 of the filling level and in particular the step of checking whether the second threshold S2 has been exceeded, on the basis of relative changes in capacitance as measured in at least the first and second measurement modes. The second threshold S2 substantially corresponds to a filling level corresponding to filling level 2d in FIGS. 1 and 2 and is in a range in which the first and the second electrodes E1, E2 are spaced apart, so that the first electrode E1 is completely covered by filling material and the second electrode E2 is not covered by filling material. Second threshold S2, also referred to as the second filling material threshold S2, does not necessarily have to be limited to a specific value, but may accordingly include a limited range of values, namely the range in which the first and second electrodes E1, E2 are spaced apart from one another. However, since the spacing between the first and second electrodes E1, E2 is as small as possible, preferably less than half the respective width of the electrode or the respective diameter of the electrode, the second threshold S2 can be detected relatively precisely. When the container is being filled, the second threshold S2 can for instance be detected by the fact that, once it is exceeded, the relative change in capacitance measured in the first measurement mode does no longer change significantly, since a filling level change within the measuring range of the second electrode E2 is outside the measuring range covered by the first measurement mode of the first electrode E1, and on the other hand since the relative change in capacitance measured in the second measurement mode changes noticeably, i.e. increases as a function of the permittivity of the filling material (see FIG. 7). While the container is emptied, the second threshold S2 can be determined based on the fact that once it is undershot, the relative change in capacitance measured in the first measurement mode will change noticeably on the one hand, in particular it will decrease from a previously assumed maximum value as a function of the permittivity of the filling material, and on the other hand the relative change in capacitance measured in the second measurement mode will no longer change significantly, so that substantially no change in capacitance can be measured anymore compared to a capacitance value detected during empty calibration (see FIG. 7), since a filling level that has fallen below the second threshold S2 is outside the measuring range covered by the second measurement mode. Similarly, it can be checked whether the second threshold S2 has been exceeded, or not undershot.

If the check establishes that the second threshold S2 has not been exceeded, a new check is carried out according to FIG. 6 to determine whether the first threshold S1 has been exceeded by the respective current filling level. If the answer is yes, which should always be the case when the container is being filled, then the previously described adaptive algorithm for calculating the current filling level will be executed as outlined in FIG. 8 by way of example.

If, however, the check establishes that the current filling level has exceeded the second threshold S2, the expected maximum filling level in the container is preferably calculated according to FIG. 6, which substantially corresponds to filling level 2f as indicated in FIGS. 1 and 2. In order to calculate the expected maximum filling level, a filling level between the second threshold S2 and the maximum filling level is first calculated, in particular a maximum relative change in capacitance assuming a maximum filling level, i.e. a maximum relative change in capacitance which corresponds to the relative change in capacitance at the maximum filling level. The maximum relative change in capacitance is preferably calculated continuously, and the calculation is based on the respective relative changes in capacitance as measured in the first measurement mode and on a calibration value of the filling level probe, in particular a calibration value calculated as part of the method for calibrating the filling level probe. As already explained above and as can be seen in FIG. 7, the change in capacitance measured in the first measurement mode assumes a maximum value depending on the permittivity of the filling material once the second threshold has been exceeded, since a filling level in this range is outside the measuring range of the first electrode E1 and the first electrode E1 is then completely covered by filling material. On the basis of the maximum value detected in the first measurement mode, a maximum relative change in capacitance likely to be given at the maximum filling level can be calculated, in particular by multiplication with the lengths ratio of the first and second electrodes E1, E2 as obtained from the calibration value. The permittivity of the filling material per se is not required for calculating the maximum relative change in capacitance, since it is already implicitly taken into account by the respective maximum value detected in the first measurement mode. Consequently, a separate determination of a relative permittivity of the filling material using an additional reference electrode can be dispensed with. The maximum relative change in capacitance to be expected is calculated linearly under the assumption that the counter electrode extends substantially parallel and equidistantly to the first and second electrodes E1, E2 over the entire measurement section. If the current filling level falls below the second threshold S2, the previously calculated maximum relative change in capacity is recorded. If the second threshold S2 is exceeded again, the continuous calculation of the maximum relative change in capacitance is continued.

Furthermore, the respective filling level can be calculated based on relative changes in capacitance measured in the third measurement mode at a filling level between the second threshold S2 and the maximum filling level, which corresponds to a calculated maximum relative change in capacitance or a maximum relative change in capacitance determined as a result of performing the calibration measurement. In particular a ratio between the relative change in capacitance as measured in the third measurement mode and the maximum relative change in capacitance as calculated or detected as part of the calibration measurement is used to calculate the respective current filling level. If the measurement arrangement and the filling material are identical when performing the filling level measurement compared to the measurement arrangement and the filling material in the context of the calibration measurement, the relative change in capacitance as detected in the context of the calibration measurement at the maximum filling level in the third measurement mode can be used as the maximum relative change in capacitance. However, if the measurement arrangement used for the filling level measurement and/or the permittivity of the filling material differ from those of the calibration measurement, the maximum relative change in capacitance has to be calculated and used for the filling level calculation. Measurement arrangement refers to the container geometry, for example, to the installation position of the filling level probe in relation to the container and counter electrode, and/or to the installation position of the counter electrode in the container.

Figure 8:
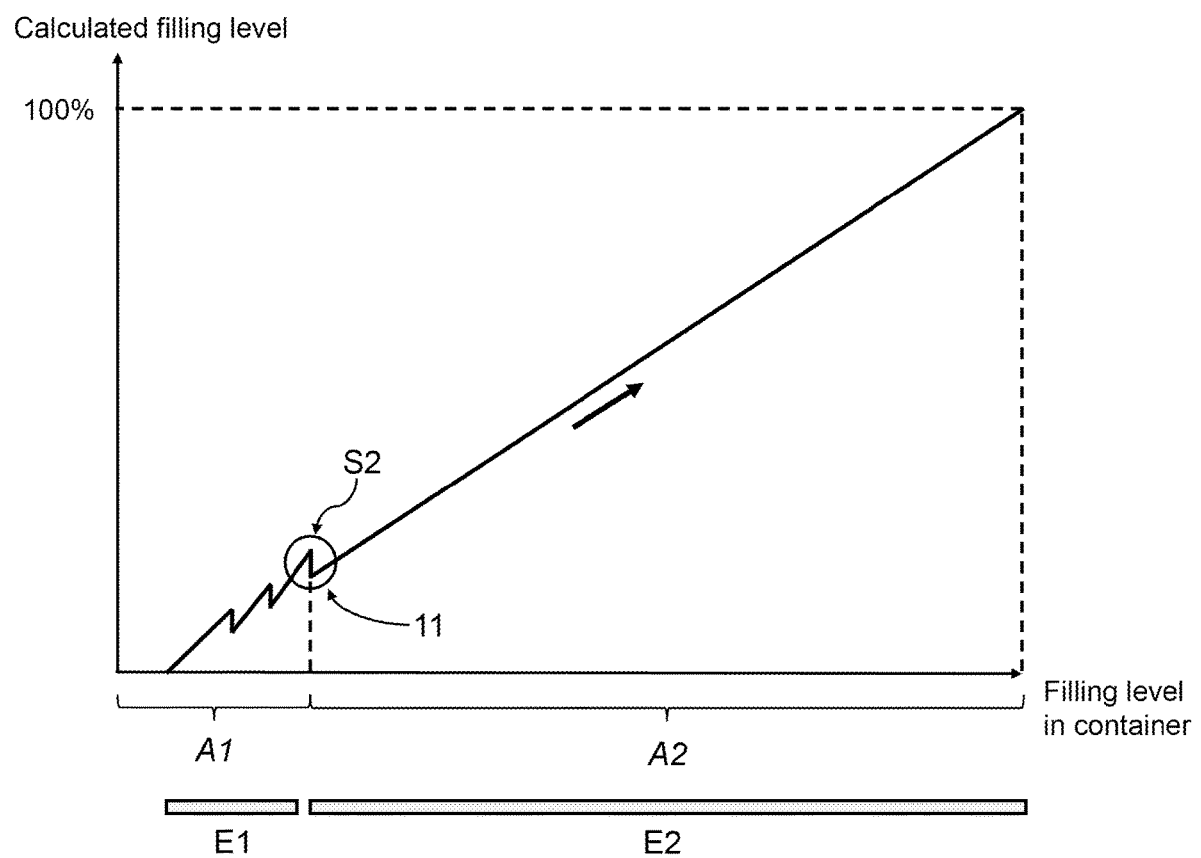
FIG. 8 is a schematic diagram of a filling level calculated when the container is being filled as a function of the level of filling material in the container.
Figure 9:
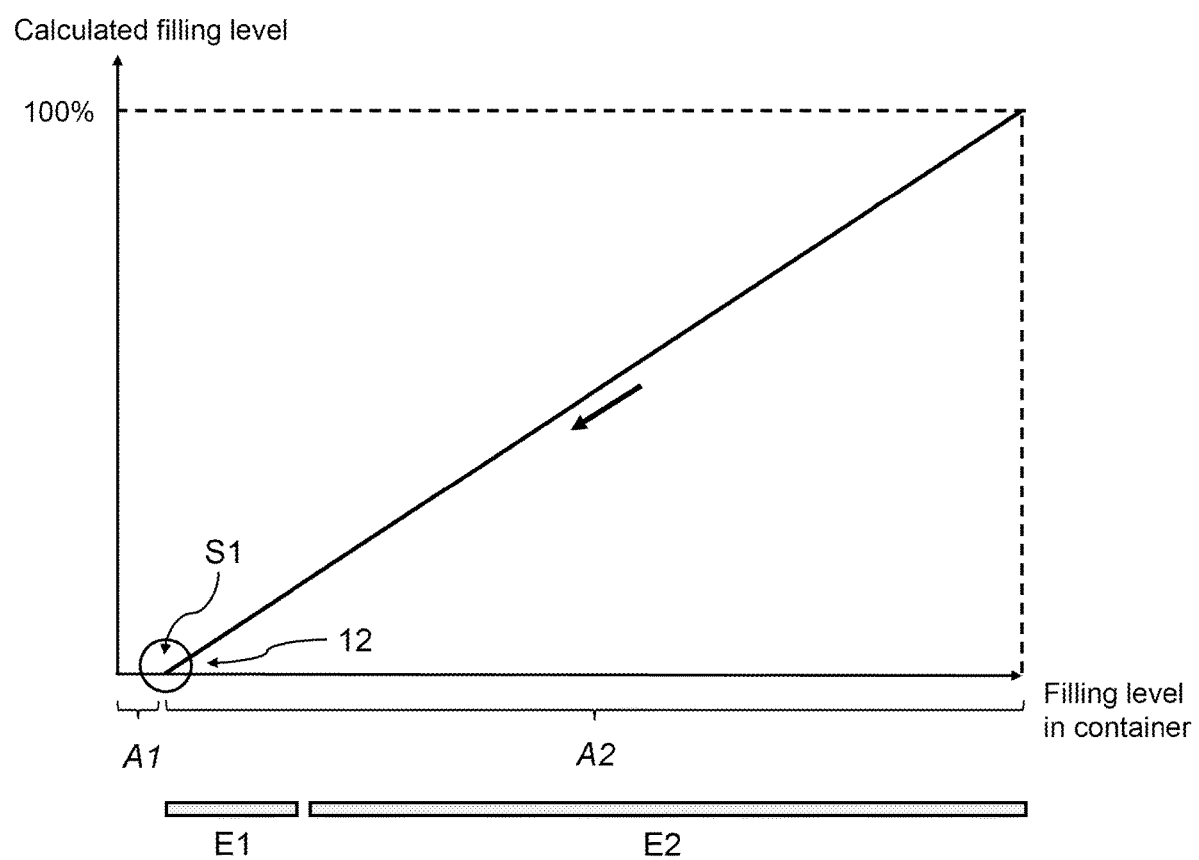
FIG. 9 is a schematic diagram of a filling level calculated when the container is being emptied as a function of the level of filling material in the container.

An example of such a filling level calculation is given in FIG. 6. According to the processing sequence outlined in FIG. 6, a linear algorithm is executed as the second algorithm A2 for calculating the current filling level, specifically while the filling level is increasing, as indicated by the arrow shown in FIG. 8, when the second threshold S2 has been exceeded (see FIG. 8), and in the case of a decreasing filling level, as indicated by the arrow shown in FIG. 9, until the first threshold S1 is undershot (see FIG. 9). Thus, when the filling level increases, enabling 11 of the linear algorithm, i.e. the second algorithm A2, occurs as soon as the second threshold S2 is exceeded, as indicated in FIG. 8, and when the filling level decreases, disabling 12 of the linear algorithm, i.e. the second algorithm A2, occurs as soon as the first threshold S1 is undershot, as indicated in FIG. 9. The linear algorithm evaluates a ratio between the respective relative change in capacitance as measured at least in the third measurement mode and a maximum relative change in capacitance under the assumption of the maximum filling level. The maximum relative change in capacitance is either calculated or was previously determined as a result of performing the calibration measurement. Based on the evaluated ratio, the linear algorithm determines the current filling level independently of the permittivity of the filling material. The reason for the designation "linear algorithm" is that for the calculation of the current filling level, the linear algorithm assumes a linearity between the current filling level to be calculated and the relative change in capacitance as measured at least in the third measurement mode. Since the linear algorithm has more measurement data available than the adaptive algorithm, for example the maximum value of the capacitance change measured in the first measurement mode, the linear algorithm is able to calculate the current filling level more precisely than the adaptive algorithm.

If it is detected during the execution of the linear algorithm, in particular while the container is being emptied, that the current filling level has fallen below the second threshold S2, it will first be checked, according to FIG. 6, whether the current filling level has already fallen below the first threshold S1. If the answer is no, the linear algorithm according to FIG. 9 continues to be executed. However, if the answer is yes, the execution of the linear algorithm is terminated or the linear algorithm is disabled, according to FIG. 9, reference numeral 12. It is then possible, for example, to execute the adaptive algorithm for calculating a filling level until the container is completely empty, as indicated in FIG. 9. In addition, a new check is carried out at regular time intervals to determine whether the current filling level has exceeded the first threshold S1.

It may also be contemplated, as part of the method according to the invention for capacitive filling level measurement, to detect further thresholds in addition to the first and second thresholds S1, S2, which may be below or above the first and/or second thresholds S1, S2 and preferably are based on continuously calculated relationships consisting of the relative changes in capacitance as measured in the first and second measurement modes. Such further threshold values allow to take into account any hystereses that may occur when detecting the relative changes in capacitance, whereby the accuracy of the filling level calculation can be improved.

Figure 7:
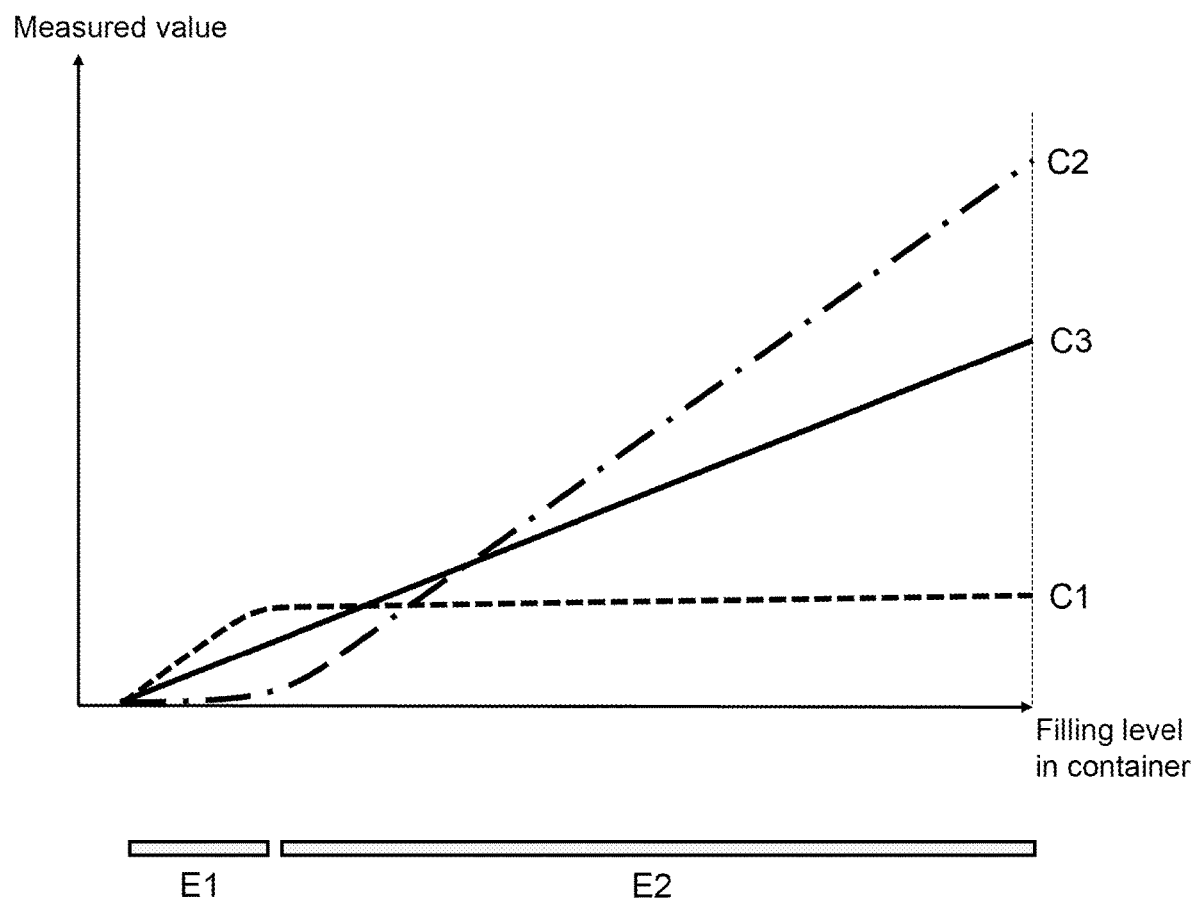
FIG. 7 is a schematic diagram of the relative changes in capacitance as measured in the first, second, and third measurement modes as a function of the level of filling material in the container.

FIG. 7 shows a schematic diagram of the measured relative changes in capacitance in the first, second, and third measurement modes as a function of the height of the filling material, or the filling level, in the container. When the filling level probe is operated in the first measurement mode, relative changes in capacitance C1 as measured between the counter electrode and the first electrode E1 as the measurement electrode can already be detected shortly before the lower end of the first electrode E1 is reached, depending on the permittivity of the filling material. Under the assumption that the permittivity of the filling material does not change significantly, the value of the relative changes in capacitance C1 measured in the first measurement mode will increase substantially linearly while the height of the filling material in the container increases. This linear increase ends approximately at a filling level corresponding to filling level 2d in FIGS. 1 and 2, that is in the vicinity of the second threshold value, where the value of the relative changes in capacitance C1 measured in the first measurement mode reaches a maximum. When the filling level in the container continues to rise, a plateau will be formed at this maximum, which extends all the way to the maximum filling level.

When the filling level probe is operated in the second measurement mode, relative changes in capacitance C2 measured between the counter electrode and the second electrode E2 as the measurement electrode can already be detected before the lower end of the second electrode E2 is reached, depending on the permittivity of the filling material. As illustrated in FIG. 7, the relative changes in capacitance C2 may already be measurable at a filling level that falls into the measuring range of the first electrode E1, depending on the permittivity of the filling material. The relative changes in capacitance C2 measured in the second measurement mode increase substantially linearly as a function of the level of the filling material in the container and the permittivity of the filling material, until the filling level of the filling material reaches the maximum filling level.

When the filling level probe is operated in the third measurement mode, relative changes in capacitance C3 measured between the counter electrode and the interconnected first and second electrodes E1, E2 as the measurement electrodes can be detected shortly before the lower end of the first electrode E1 is reached, depending on the permittivity of the filling material, as is the case in the first measurement mode. Since, in the third measurement mode, the measuring range extends along the entire measurement section of the filling level probe, the relative changes in capacitance C3 will increase substantially linearly over the entire measurement section, as a function of the filling level in the container and the permittivity of the filling material, until the level of the filling material in the container reaches the maximum level.

It should be noted here that all features that will be apparent to a person skilled in the art from the present description and the figures, can be combined both individually and in any combination with others features or groups of features disclosed in the present invention, even if these features were only described in conjunction with certain other features, unless this has been explicitly excluded or technical circumstances make such combinations impossible or pointless. For the sake of brevity and readability of the description, a comprehensive explicit description of all possible combinations of features has been avoided. The scope of protection of the present invention as defined by the claims is not limited by the specific embodiments of the invention as illustrated in the description and the drawings, which are given merely by way of example. Modifications to the disclosed embodiments will be obvious to those skilled in the art from the drawings, the specification, and the appended claims. The word "comprising" as recited in the claims does not exclude other elements or steps. The indefinite article "a" or "an" does not exclude a plural. A combination of features that are claimed in different patent claims is not excluded.

LIST OF REFERENCE NUMERALS

1 Container
1a Container wall
2 Filling material
2a Filling level below first threshold
2b Filling level corresponding to first threshold S1
2c Filling level between first and second thresholds
2d Filling level corresponding to second threshold S2
2e Filling level between second threshold and maximum filling level
2f Maximum filling level
3 Filling level probe
3a Substrate
3b Electrically insulating material
4 Measuring electronics
5 Measurement circuit
5a Measurement potential
5b Shielding potential
5c Counter electrode potential
6 Switching unit
6a First switch
6b Second switch
7 Evaluation unit
11 Enabling of A2
12 Disabling of A2
E1 First electrode
E2 Second electrode
S Shielding electrode
C1 Relative change in capacitance measured in first measurement mode
C2 Relative change in capacitance measured in second measurement mode
C3 Relative change in capacitance measured in third measurement mode
S1 First threshold
S2 Second threshold
A1 First algorithm
A2 Second algorithm

The invention claimed is:

1. A filling level measuring device for capacitive filling level measurement of filling material in the form of liquids and/or bulk materials in a container that has a counter electrode integrated in the container, comprising:

measuring electronics and a filling level probe connectable to the measuring electronics;

wherein the filling level probe includes a first electrode and a second electrode which have to be introduced into the container for the filling level measurement and which, in their introduced state, extend into the container one after the other in alignment along their longitudinal extension and spaced apart from each other and substantially parallel to the counter electrode; so that:

when the container is being filled, the first electrode will first be covered by filling material before the second electrode is at least partially covered by filling material, and a measurement section is defined by the entire range between a first end of the first electrode remote from the second electrode and a second end of the second electrode remote from the first electrode;

wherein the measuring electronics are configured to provide a measurement potential, a shielding potential, and a counter electrode potential, and comprise a switching unit including a first switch that is electrically connectable to the first electrode and a second switch that is electrically connectable to the second electrode;

wherein, for operating the filling level measuring device, the switching unit is operable to set a first, second, or third measurement mode, by having the first switch adapted to switch over between the measurement potential or the shielding potential that are configured to be applied to the first electrode, and by having the second switch adapted to switch over between the measurement potential or the shielding potential that are configured to be applied to the second electrode, and wherein in the first measurement mode the measurement potential is applied to the first electrode and the shielding potential to the second electrode, in the second measurement mode the shielding potential is applied to the first electrode and the measurement potential to the second electrode, and in the third measurement mode the measurement potential is applied to the first and second electrodes, and in each of the three measurement modes the counter electrode potential is applied to the counter electrode; and wherein the measuring electronics comprise an evaluation unit that is electrically connected to the switching unit and adapted to control the switching unit and to calculate the filling level on the basis of relative changes in capacitance compared to a completely empty container as measured by the measurement electronics in each of the three measurement modes.

2. The filling level measuring device of claim 1, wherein the first electrode has a first length and the second electrode has a second length, such that the second length is greater than the first length or at least equal to the first length.

3. The filling level measuring device of claim 1, wherein:

the filling level probe comprises a substrate on which the first and second electrodes are attached, wherein the substrate is in the form of a rod or circuit board and is surrounded by at least one electrically insulating material; and/or the filling level probe is mounted substantially vertically in the container, in or on the container wall.

4. The filling level measuring device of claim 1, wherein the first electrode and/or the second electrode are in the form of individual rings or plates with an insulator.

5. The filling level measuring device of claim 1, wherein the filling level probe has a shielding electrode which is arranged between the first end of the first electrode and a bottom of the container.

* * * * *